(12) United States Patent
Bondy et al.

(10) Patent No.: US 7,142,326 B2
(45) Date of Patent: Nov. 28, 2006

(54) METHOD AND APPARATUS FOR VARIABLE DATA DOCUMENT PRINTING

(75) Inventors: Chris Bondy, Penfield, NY (US); William G. Miller, Canandaigua, NY (US); Charles H. Russell, Rochester, NY (US); Patrick J. Waara, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 795 days.

(21) Appl. No.: 09/858,556

(22) Filed: May 16, 2001

(65) Prior Publication Data

US 2002/0191219 A1    Dec. 19, 2002

(51) Int. Cl.
*G06K 15/00* (2006.01)

(52) U.S. Cl. .................................. 358/1.18; 358/1.15

(58) Field of Classification Search ............... 358/1.18, 358/1.15, 1.13, 1.14; 382/101
See application file for complete search history.

(56) References Cited

U.S. PATENT DOCUMENTS

| | | | |
|---|---|---|---|
| 3,955,502 A | * | 5/1976 | VON Hofe ................ 101/484 |
| 4,527,252 A | | 7/1985 | Donohue et al. |
| 4,776,028 A | | 10/1988 | Tanaka et al. |
| 5,043,749 A | | 8/1991 | Punater et al. |
| 5,113,494 A | | 5/1992 | Menendez et al. |
| 5,125,072 A | | 6/1992 | Ng |
| 5,129,048 A | | 7/1992 | Ng |
| 5,136,316 A | | 8/1992 | Punater et al. |
| 5,504,842 A | | 4/1996 | Gentile |
| 5,506,944 A | | 4/1996 | Gentile |
| 5,539,865 A | | 7/1996 | Gentile |
| 5,544,290 A | | 8/1996 | Gentile |

(Continued)

FOREIGN PATENT DOCUMENTS

EP        0 814 425 A2    12/1997

(Continued)

OTHER PUBLICATIONS

"Personalized Printing—Adobe's © Personalization Strategy For The Supra Production Printing Architecture", Oct. 1996.

*Primary Examiner*—Dov Popovici
(74) *Attorney, Agent, or Firm*—Nixon Peabody LLP

(57) ABSTRACT

A method and apparatus for printing a project of documents containing variable data. Print requests are received for documents and fixed and variable data required to fulfill the requests is obtained. A record is manipulated for each set of variable data in a project and correlated to the variable data. The fixed data and the variable data are combined to compose the documents and the documents in the project are printed by combining the fixed data and the appropriate variable data. An identifier can be printed on each document to permit verification that a document corresponding to each record was printed.

26 Claims, 3 Drawing Sheets

U.S. PATENT DOCUMENTS

| | | |
|---|---|---|
| 5,594,860 A | 1/1997 | Gauthier |
| 5,638,498 A | 6/1997 | Tyler et al. |
| 5,715,382 A | 2/1998 | Herregods et al. |
| 5,745,590 A * | 4/1998 | Pollard ........................ 382/101 |
| 5,765,874 A | 6/1998 | Chanenson et al. |
| 5,825,348 A | 10/1998 | Ludolph et al. |
| 5,841,898 A | 11/1998 | Liguori |
| 5,845,302 A | 12/1998 | Cyman, Jr. et al. |
| 5,937,153 A | 8/1999 | Gauthier |
| 5,959,867 A | 9/1999 | Speciner et al. |
| 6,067,103 A | 5/2000 | Ewert et al. |
| 6,134,018 A | 10/2000 | Dziesietnik et al. |
| 6,148,724 A | 11/2000 | Hart et al. |
| 6,166,821 A | 12/2000 | Blumer |
| 6,205,452 B1 | 3/2001 | Warmus et al. |
| 6,644,764 B1 * | 11/2003 | Stephens, Jr. ................... 347/3 |
| 6,836,342 B1 * | 12/2004 | Vidyanand ................. 358/1.18 |

FOREIGN PATENT DOCUMENTS

| | | |
|---|---|---|
| WO | WO 98/32096 | 7/1998 |
| WO | WO 00/16266 | 3/2000 |
| WO | WO 00/48127 | 8/2000 |
| WO | WO 00/65431 | 11/2000 |

* cited by examiner

METHOD AND APPARATUS FOR VARIABLE DATA DOCUMENT PRINTING

FIELD OF THE INVENTION

The invention relates generally to printing of documents and more specifically to a method and apparatus for variable data document printing.

BACKGROUND OF THE INVENTION

Printing of both fixed data and variable data is often a requirement in many printing applications. The phrase "fixed data," as used herein, refers to data that remains constant over a plurality of documents in a project. The phrase "variable data," as used herein, refers to data which varies between documents in a project. Examples of projects containing both fixed and variable data include projects for personalized direct mailing documents, business forms, custom calendars, personalized checks, and the like.

A personalized project includes variable data documents composed of a number of copies, where each copy can be uniquely customized for the intended recipient. The pages are composed of text, graphics, and images which can be unique to just that copy, identical on every copy, or used on some copies of the document but not on others. For example, in a customized product brochure, unique elements can include the recipient's name and address, while the product company name and logo are identical on every document, and the picture of the specific product that the recipient is interested in is found on some documents of the project, but not on others.

In view of the combinations of images and text, the need for personalization, and the desirability of high quality, the workflow of projects having both variable data and fixed data, i.e. variable data projects, especially projects containing full color documents, can become quite complex. Therefore, conventional systems for printing variable data projects are plagued by the inability to print complex projects reliably, the inability to predict production time, and poor color quality. Further, conventional systems require manual inspection of output to verify that all documents were printed successfully.

SUMMARY OF THE INVENTION

A first aspect of the invention is a system for printing a project of documents containing variable data. The system comprises a printer component and an operations management component configured to receive print requests for documents in a project, create a project for printing by the printer component, and create a record for each set of variable data in the project. The system also comprises a fixed data capture component operative to capture fixed data, a variable data source component operative to receive variable data from a variable data source, a repository component configured to store the variable data and fixed data for each project, a variable data composition component operatively coupled to the repository component and being configured to combine the fixed data and the variable data into documents for the project, and an integrity component operatively coupled to the operations management component and configured to verify that each document of the project is printed by the printer component.

A second aspect of the invention is a method for printing a project of documents containing variable data. The method comprises receiving print request for the project, capturing fixed data to be used in the documents, culling variable data from a variable data source creating a record for each set of variable data in the project, storing the variable data and the fixed data in a repository, combining the fixed data and the variable data to thereby compose the documents, printing the documents in the project, and verifying that a document corresponding to each record was printed.

A third aspect of the invention is computer readable media having instructions recorded thereon for controlling printing of a project of documents containing variable data. The instructions comprise instructions for receiving a print request for the project, instructions for capturing fixed data to be used in the documents, instructions for culling variable data from a variable data source instructions for creating a record for each set of variable data in the project, instructions for storing the variable data and the fixed data in a repository, instructions for combining the fixed data and the variable data to thereby compose the documents, instructions for printing the documents in the project, and instructions for verifying that a document corresponding to each record was printed.

BRIEF DESCRIPTION OF THE DRAWING

The invention is described through an embodiment and the attached drawings in which.

DETAILED DESCRIPTION

Figure 1:
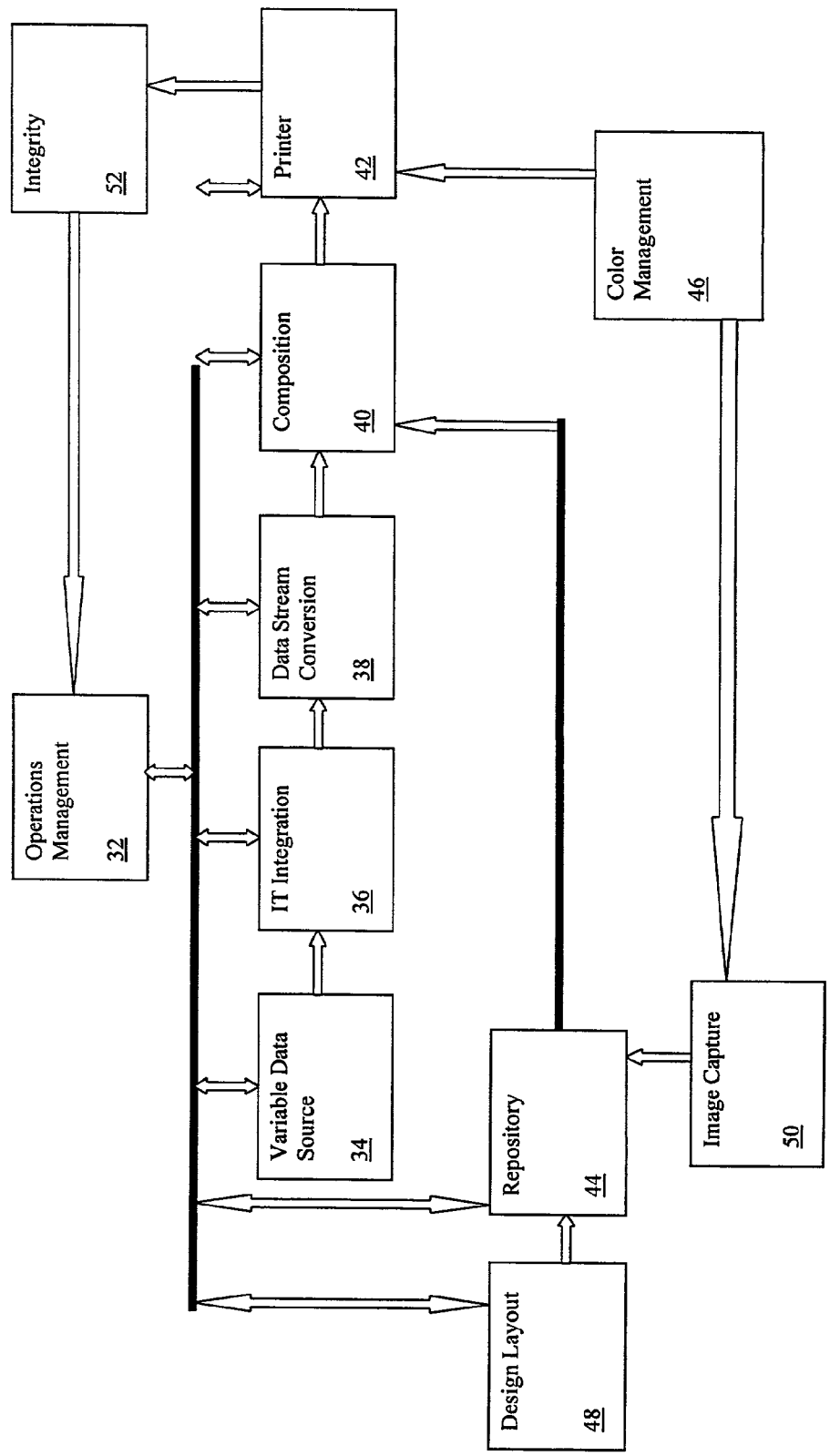
FIG. 1 is a conceptual representation of a printing system in accordance with the embodiment.

FIG. 1 illustrates the various components of a system for variable data document printing in accordance with an embodiment of the invention. Note that FIG. 1 is a conceptual representation broken down by functionality and thus the illustrated components need not necessarily correspond to any specific hardware and/or software. Operations management component 32 tracks print projects and coordinates the necessary steps and components of the system 10 (shown in FIG. 2) to complete printing of documents in the project including supervising the messaging tasks described below. Note that a "project" refers to one or more documents having the same fixed data. A "document" refers to one or more pages in a project corresponding to a set or record of variable data. Variable data used to personalize each document is received from variable data source component 34 which can be the customer IT system or any other storage or generation device for providing variable data. Integration component 36 provides integration with data source component 34 and can utilize file transfer, direct integration with customer databases, or any other method of transferring the desired variable data. Further, integration component 36 can use any type of communication channel, such as a Local Area Network (LAN), the Internet, or a serial connection for transferring data.

Data stream conversion component 38 processes the variable data and converts the variable data into a desired format, if necessary, for processing by the system. Image capture component 50 receives images for use as fixed data and can include a scanning device, camera, or any other device for capturing, creating, or importing data. Design layout component 48 creates a layout for the project that determines the appearance of the documents and stores the layout as a template used for printing of documents. Repository component 44 stores elements of the document during construction and production (see description below) including the templates, image elements, fonts, variable data records, and other resources. Composition component 40 creates variable documents to be printed by combining fixed data with variable data records guided by the design layout and outputs the documents to printer component 42 for printing. Printer component 42 typically includes a digital color printer having a Digital Front End (DFE) that receives data from composition component 40, and a color marking engine for rendering the documents. Color management component 46 insures that the color data (fixed and variable) is rendered as the correct colors by the printer using conventional techniques. For example, color management component can use the commercially available GRETAG MCBETH™ system.

When printing variable documents, such as personalized documents, each document may be unique. Accordingly integrity component 52 serves to verify that each document in a project has been printed (and printed only once) and to provide feedback to operations management component 32 in the manner described below.

Figure 2:
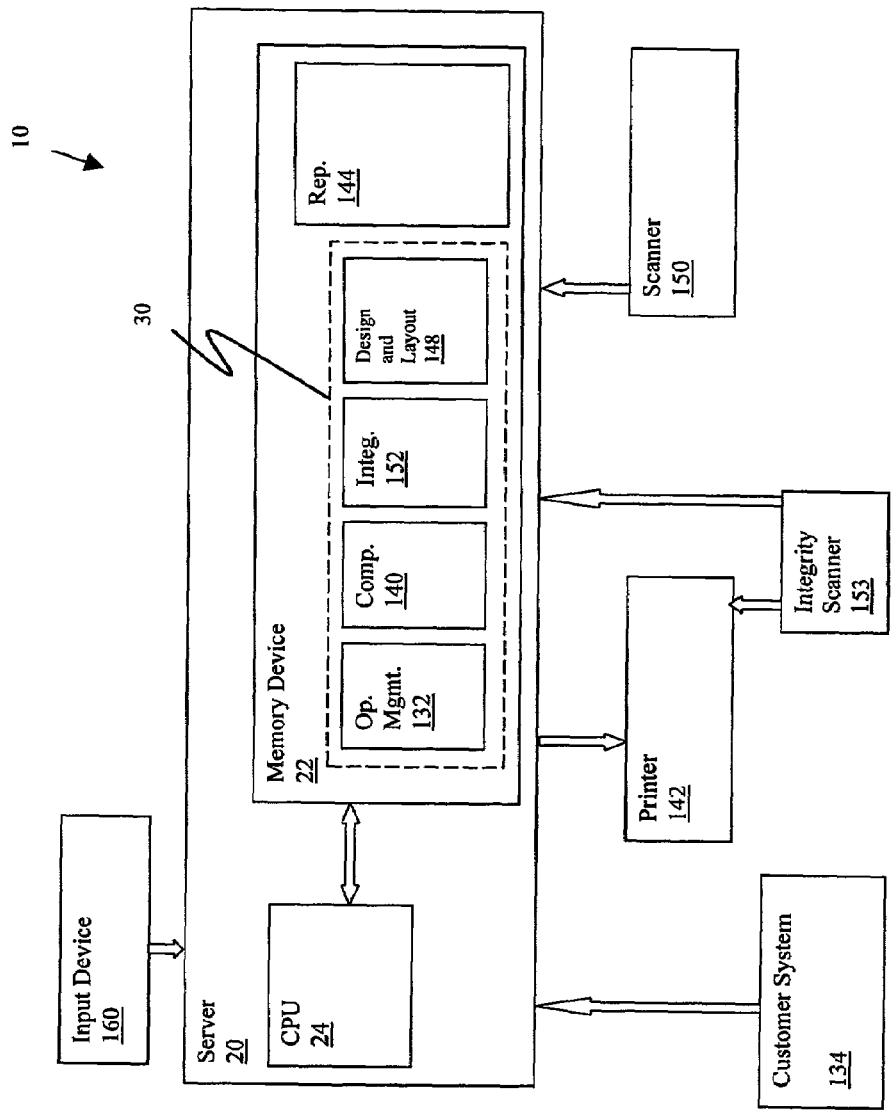
FIG. 2 is a block diagram of a computer system in accordance with the embodiment.

FIG. 2 illustrates computer system 10 in accordance with the embodiment. In FIG. 2, various hardware and software corresponds to the functional components illustrated in FIG. 1 and described above. The variable printing process runs on server 20 in the embodiment. However, the process can run on any type of computer, such as a personal computer, a mainframe, a microcomputer, a programmable controller, various devices coupled over a network, or any other device or devices capable of carrying out the described functions. Accordingly, the term "computer", as used herein, refers broadly to any data processing or logic device, or a combination of plural data processing or logic devices. For example, the invention can be accomplished using a plurality of networked devices, such as personal computers, terminals servers and the like. Server 20 includes central processing unit (CPU) 24 running an operating system, such as WINDOWS NT™, WINDOWS 2000™, UNIX, or the like. CPU 24 also runs control program 30 stored in memory device 22, such as a hard drive, CD-ROM, or the like. Also, a portion of memory device 22 is used as repository 144 for storing fixed data, variable data, and other resources as described above with respect to repository component 44. In the embodiment, memory device 22 is illustrated as a single device. However, memory device 22 can be comprised of plural memory devices in a single computer or in plural computers.

Control program 30 includes instructions for accomplishing the primary functionality of system 10 and can be written in any appropriate programming language, such as Basic, C++, or the like and compiled into machine code or interpreted for execution by CPU 24. Control program 30 includes operations management module 132 for effecting the function of operations-management component 32, composition module 140 for effecting the function of composition component 40, integrity module 152 for effecting the function of integrity component 52, and design and layout module 148 for effecting the function of design and layout component 48. By way of example only, operations management module 132 can incorporate FORTE™ software sold by Sun Corporation and DOCUMAIL™ software and composition module 140 can incorporate QUARKEXPRESS™ software sold by Quark Corporation. Operations management module 132 also includes instructions for effecting the functions of integration component 36 and data stream conversion component 38, as well as any other functionality required to query sources of variable data and format variable data for incorporation into documents.

Input device 160 can include a display, a keyboard, mouse, trackball, keypad, display, touchscreen, or the like to permit server 20 to display a user interface and to permit a user to input all menu selections, layout commands, and the like as is necessary. Printer 142 is coupled to server 20 to print the documents and is constructed as described above with respect to printing component 42. For example, printer 142 can be a printer manufactured by XEROX™ Corporation and sold under the tradename DOCUCOLOR 2060™. Once again, system 10 can include plural computers and each computer can have the requisite input device. Scanner 150, such as a color raster scanner, serves as an image capture device of image capture component 50. Integrity scanner 153 serves as a sensor and can be a bar code scanner, a camera (such as an SONY™ camera) or any type of device for reading the integrity symbol, i.e. indicia, described below to provide input to integrity module 152.

Figure 3:
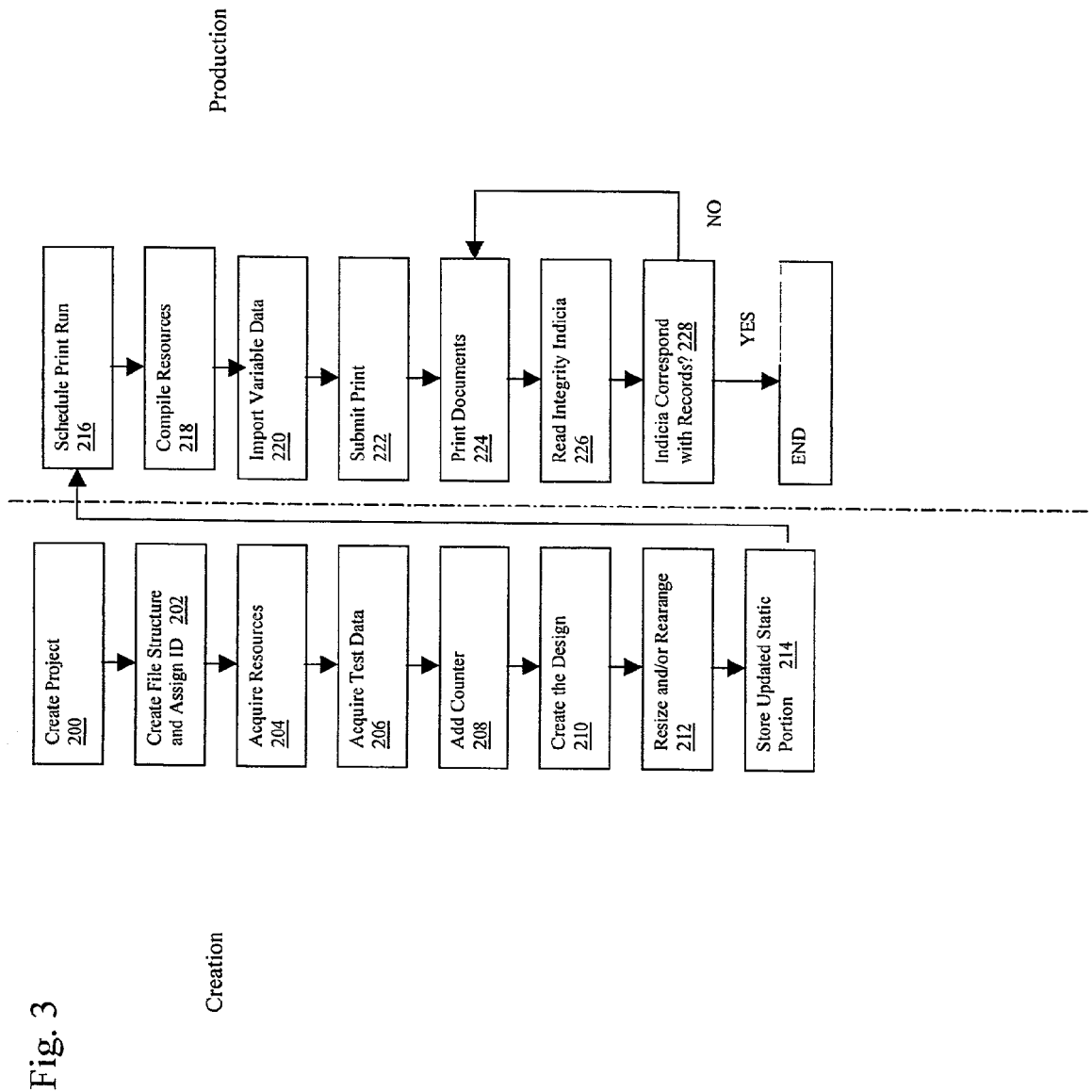
FIG. 3 is a flow chart of the printing process of the embodiment.

FIG. 3 is a flowchart of the process for printing variable data document projects in accordance with the embodiment. The process can be divided into two distinct phases. The first phase is the creation phase (to the left of the dotted line) and the second phase is the production phase (to the right of the dotted line). Referring to FIGS. 1 and 2, each component communicates with operations management component 32 to permit operations management component 32 to maintain a real-time status of each project. For example, such communication can be in an HTTP compliant format using XML messaging in the manner described below. The process begins in step 200 in which a project is created by operations management component 32. In step 202, a file structure and directory structure for the project is set up in repository 140 in accordance with an assigned identification, such as a customer ID and a job ID. The ID is used as metadata to permit tracking and reporting of status and other variables. The file structure, ID and other project specific data can be stored as a configuration file for the project.

Resources for the project, such as images, fonts, and graphics, are acquired in step 204. Also, in step 204, the resources for the project are stored in folders, i.e. directories, in accordance with the configuration file and tagged with appropriate metadata tags to identify the resources and associate the resources with the proper project and documents. In step 206, test data is acquired. Test data can be any set of data corresponding to expected variable data, such as a single representative record from a database to be used for variable data. In step 208, a counter is added to the file to provide a unique sequence number to each record of the project.

In step 210, a markup of the page layout design is imported into repository 44 and a static portion of the print job is created as a template. In step 212, conventional design tools are used to resize and/or rearrange images of the static portion if necessary and in step 214, updates are stored in repository 44. Steps 210, 212, and 214 can be accomplished in a repeated manner until the image resources are correctly sized and arranged. All resources and template pages are tagged and stored to correspond to the project in the most recent updated form. At this time, the operator may want to schedule a proof run to verify that the job is ready for printing. In such a case, the operator selects "proof run" from a menu or other user interface on a display of server 20. In such a case, a proof run is accomplished in a manner similar to a production run described below.

If a proof run is satisfactory or not required, the operator selects "schedule print run" and the process proceeds to step 216 in which a print run is scheduled. Scheduling includes validating that all resources required for the project are available based on the resources acquired in step 204. In step 218, all resources are compiled to a work area in repository 144. Keep in mind that all resources have been tagged with metadata for quick retrieval. In step 220, the print job is prepared by importing variable data, such as personalized data from a customer, and the variable data is integrated into the fixed data template. For example, the system can have direct database access to a customer database via IT integration component 36 using Structural Query Logic (SQL). Alternatively, IT integration component 36 can access data generated from Web site selections, such as literature requests. The project is composed into documents and submitted to printer component 42 in step 222.

In step 224, the documents of the project are printed by printer 142. Step 224 includes printing indicia of the document on at least some pages of the document. Such indicia can include a bar code, DATALGYPHS™, or other visible or non visible indicia. In step 226, integrity scanner 153 reads all indicia and reports the same to integrity module 152. In step 228, operations management module 132 compares the indicia read by integrity scanner 153 with records of the project to verify the integrity of the print run, i.e. that a document corresponding to each record was printed. If any documents have not been printed, the process returns to step 218 for printing of the missing documents and proceeds through to step 228 again. If no records are missing, the process ends.

It can be seen that the various components of the embodiment can communicate with one another to coordinate and manage all operations. Operations management component 32 can include an XML application to act as a datagram for transferring data in the form of messages between operations management component 32 and other components. In the case of integrity component 40, the data comprises primarily record numbers corresponding to indicia scanned by integrity scanner 153. These record numbers reflect records printed for a variable data print job. All variable data records can have a unique sequence number. These sequence numbers are incorporated into the variable data document and barcodes, or other indicia, are printed on each page, or group of pages, identifying the record used to create that document.

Operations management component 32 of the embodiment uses an http/XML interface to communicate with other components in the system. Of course, other interfaces, such as an Enterprise Java Bean or Distributed Common Object Model mechanism, can be used. HTTP protocols can be used to call an Active Server Page (ASP) passing XML data. The format of the messages created by the XML application can be modeled after existing document type definitions (DTDs). The datagram can be used as a data container with a descriptive nature. It also supports a simple model for a data list, so more than one data component can be transferred in a message. Additionally every "packet" of data or message sent is human readable and can be viewed with a web browser. The "packets" or "datagram documents" can travel automatically from one system to another and never need be seen by humans. An example document illustrating a typical datagram of the embodiment is shown below: The <List_Inspectron> tag acts as the document type declaration and it is also the root element for the entire structure.

```
<List_Inspectron>
    <InspectronData>
        <ControlArea date="19990916T1500Z">
            <LogicalID>inspectron.com</LogicalID>
            <Component>DocumailRead</Component>
            <Task>test</Task>
            <ReferenceID>CHUNK#5</ReferenceID>
        </ControlArea>
        <DataArea>
            <Status code="OK"> Running Ok! </Status>
            <DataList>
                <A code="OK">1234</A>
                <A code="OK">1235</A>
                <A code="OK">1236</A>
                <A code="OK">1237</A>
            </DataList>
        </DataArea>
    </InspectronData>
</List_Inspectron>
```

The <ControlArea> contains all the descriptive information relating to process control. The Date, data source and task reference information is all contained therein. The <DataArea> element contains specific status and data information. The <DataList > element acts as a container for the list of actual data elements. These individual data elements are contained in the <A> element. The list below describes the elements in the XML message document of the embodiment.

<List_Inspectron> The root container element.

<ControlArea> Container for relevant process information such as a DATE attribute and LOGICALID, COMPONENT, TASK, REFERENCEID elements.

Date attribute The date of this transaction.

<LogicalID > A descriptor identifying the sender of the message.

<Component > A descriptor identifying the type of information being sent.

<Task> A descriptor identifying the task or project with which this data is associated.

<ReferenceID> A descriptor identifying the subset of data being delivered.

<DataArea> The container element for a data area of the document.

<Status> Identifies the status of this set of data.

Code attribute Set to "FAULT" if errors or exceptions exist in the originating process, otherwise set to "OK".

<DataList> The container for the list of data items

<A> The data

Code attribute Set to "FAULT" if errors or exceptions exist in the originating process, otherwise set to "OK".

As an example, the embodiment can be used to print personalized catalogs for a targeted marketing campaign by a mail order retailer. The retailer has a database (variable data source 34) containing profiles of its customers and a history of their purchases, i.e. customer relationship management (CRM) data. The retailer can employ a graphic designer to create a layout for personalized catalogs and store the layout as a template in repository 144. The retailer may also capture images and descriptions of products and store them as resources in repository 144. The customer information is extracted from the database of the retailers IT system by IT integration component 36, reformatted if necessary by conversion component 38, and stored in repository 144. In turn, composition component 40 pulls the necessary resources from repository 144 and formats the personalized catalogs. The catalogs are then delivered to printer 142 for printing.

The messaging of the embodiment permits a high level of integration between system components and external components. For example, each component can communicate data in real time to operations management component 32 to permit operations management component 32 to ascertain and report the status of each project at all times. Further, the system can interface with a customer IT system to cull data from the IT system for use as variable data. For example, CRM data can be queried on the customer system and used to create personalized documents as noted above. The messaging of the embodiment permits a high level of integration and automation. Accordingly, equipment and resources are utilized efficiently. Any type of messaging can be used. Any type of communication channels can be used to provide communication between the various equipment and components. For example the TCP/IP protocols can be used and the equipment can be coupled over a network, such as an Ethernet LAN or the Internet.

Further, the messaging of the embodiment permits components and equipment to be replaced by other elements having similar functionality. Further, the workflow can be altered without affecting the components or equipment because the workflow is independent of the components and equipment. For example, the user may utilize any desired composition engine that is most suitable or most familiar to the user.

The invention has been described through an embodiment and examples. However various modifications can be made without departing from the scope of the invention as defined by the appended claims and legal equivalents.

What is claimed:

1. A system for printing a project of documents containing variable data, said system comprising:
   a printer component;
   an operations management component configured to receive print requests for documents, create a project for printing by said printer component, and manipulate a record for each set of variable data in the project;
   a fixed data capture component operative to capture fixed data;
   a variable data source module operative to receive variable data from a variable data source;
   a repository component configured to store the variable data and the fixed data for each project;
   a variable data composition component operatively coupled to said repository component and being configured to combine the fixed data and the variable data into documents; and
   an integrity component operatively coupled to said operations management component and configured to verify that each document in said project is printed by said printer component;
   wherein during each project the operations management component is configured to ascertain the status of each project at one or more of the fixed data capture component, the repository component, the variable data composition component, and the integrity component.

2. A system as recited in claim 1 wherein said repository component is operative to store the variable data and the fixed data of a project prior to combination by said variable data composition component and said operations management component is operative to associate metadata with the fixed data and each record of the variable data.

3. A system as recited in claim 1, wherein said printer component comprises a digital color printer.

4. A system as recited in claim 1, further comprising a sensor operatively coupled to said integrity component and configured to sense documents after printing and send an indication signal to said integrity component.

5. A system as recited in claim 4, wherein said printer component is configured to print unique indicia on each document.

6. A system as recited in claim 5, further comprising a sensor configured to sense the indicia, said sensor being operatively coupled to said integrity component.

7. A system as recited in claim 1, further comprising means for passing messages between said components.

8. A method for printing a project of documents containing variable data, said method comprising:
   receiving a print request for documents of a project;
   capturing fixed data to be in said documents;
   receiving variable data from a variable data source;
   storing the variable data and the fixed data in a repository;
   manipulating a record for each set of variable data in the project;
   combining the fixed data and the variable data to thereby compose the documents;
   printing the documents in the project; and
   verifying that the documents were printed in said printing step;
   wherein the status of each project can be ascertained at one or more of the capturing, the receiving variable data, the storing, the manipulating, and the combining.

9. A method as recited in claim 8, wherein said storing step comprises storing the variable data and the fixed data in the repository prior to said combining step and future comprises associating metadata with each element of fixed data and variable data stored in said repository.

10. A method as recited in claim 8, wherein said verifying step comprises sensing each document printed in said printing step and comparing the results of the sensing step with the print request.

11. A method as recited in claim 10, wherein said printing step comprises printing unique indicia on each document and said sensing step comprises sensing the indicia.

12. A method as recited in claim 10, wherein said step of receiving variable data comprises extracting data from a database.

13. A method as recited in claim 8, further comprising passing messages relating to the status of each project.

14. Computer readable media encoded with computer executable instructions recorded thereon for controlling printing of a project of documents containing variable data, said instructions comprising:
   receiving a print request for documents;
   capturing fixed data to be in said documents;
   receiving variable data from a variable data source;
   storing the variable data and the fixed data in a repository;
   creating a record for each set of variable data in the project;
   combining the fixed data and the variable data to thereby compose the documents;
   printing the documents in the project; and
   verifying that the documents were printed in accordance with said instructions for printing;
   wherein the status of each project can be ascertained at one or more of the capturing, the receiving variable data, the storing, the creating, and the combining.

15. Computer readable media as recited in claim 14 wherein said storing comprise storing the variable data and the fixed data in the repository and associating metadata with each element of fixed data and variable data stored in the repository.

16. Computer readable media as recited in claim 14, wherein said verifying comprise sensing printed documents and comparing results of sensed documents with the print request.

17. Computer readable media as recited in claim 16, wherein said printing comprise printing unique indicia on each document and said sensing comprise sensing the indicia.

18. A system as set forth in claim 1 wherein the operations management component is configured to ascertain the status of each project at each of the fixed data capture component, the repository component, the variable data composition component, and the integrity component.

19. A method as recited in claim 8 wherein a status of each project can be ascertained at each of the capturing, the receiving variable data, the storing, the manipulating, and the combining.

20. Computer readable media as recited in claim 14 wherein a status of each project can be ascertained at each of the capturing, the receiving variable data, the storing, the creating, and the combining.

21. A system as set forth in claim 1 wherein the operations management component is configured to ascertain the status of each project in real time.

22. A method as recited in claim 8 wherein the status of each project can be ascertained in real time.

23. Computer readable media as recited in claim 14 wherein the status of each project can be ascertained in real time.

24. A system as set forth in claim 1 further comprising a color management component coupled to the printer component and configured to verify color data is correctly rendered for each project.

25. A method as recited in claim 8 further comprising verifying color data for the printing is correctly rendered for each project.

26. Computer readable media as recited in claim 14 further comprising verifying color data for the printing is correctly rendered for each project.

* * * * *